(12) United States Patent
Patrickson

(10) Patent No.: US 6,237,958 B1
(45) Date of Patent: May 29, 2001

(54) PRETENSIONER

(75) Inventor: James Patrickson, Wigton (GB)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/441,424

(22) Filed: Nov. 16, 1999

(30) Foreign Application Priority Data

Jul. 14, 1999 (GB) .................................................. 9916535

(51) Int. Cl.⁷ .................................................. B60R 22/36
(52) U.S. Cl. ........................................... 280/806; 180/371
(58) Field of Search ..................................... 280/806, 805; 188/371; 60/632, 635, 638; 297/476, 477, 478, 470, 471

(56) References Cited

U.S. PATENT DOCUMENTS

| 3,942,819 | | 3/1976 | Schwanz et al. | 280/150 |
|---|---|---|---|---|
| 4,023,427 | * | 5/1977 | Beier | 280/806 |
| 4,917,210 | * | 4/1990 | Danicek et al. | 280/806 |
| 5,207,618 | * | 5/1993 | Nishizawa | 280/806 |
| 5,358,275 | * | 10/1994 | Fohl | 280/806 |
| 5,586,677 | * | 12/1996 | Kopetzky et al. | 280/806 |
| 5,924,730 | * | 7/1999 | Burrow et al. | 280/806 |
| 5,971,488 | * | 10/1999 | Pedronno et al. | 280/806 |
| 6,068,664 | * | 5/2000 | Meyer et al. | 280/806 |

FOREIGN PATENT DOCUMENTS

| 2364235 | * | 6/1975 | (DE) | 297/470 |
|---|---|---|---|---|
| 4020600 | * | 1/1991 | (DE) | 280/806 |
| 1417665 | | 7/1974 | (GB) . | |
| 9613409 | | 5/1996 | (WO) . | |

* cited by examiner

Primary Examiner—Eric Culbreth
(74) Attorney, Agent, or Firm—Lonnie Drayer

(57) ABSTRACT

A locking mechanism for a pretensioner in a vehicle safety restraint has a cylinder and a piston mounted for movement within and along the cylinder. One end of a cable is connected to the piston and the other end of the cable is connected to a safety restraint. The locking mechanism is a locking block and structure that resiliently biases the locking block away from the piston toward the inside wall of the cylinder. The locking block may be tapered as a wedge, and/or sloping surfaces may be provided on the piston or on the housing. More than one locking block may be spaced circumferentially about the piston.

11 Claims, 6 Drawing Sheets

PRETENSIONER

FIELD OF THE INVENTION

The present invention relates to a pretensioner for a vehicle seat belt and particularly to a locking device for such a pretensioner.

BACKGROUND OF THE INVENTION

A pretensioner is used with a vehicle seat belt to rapidly tension a length of seat belt webbing at the onset of a crash to more securely restrain the vehicle occupant by restricting his forward movement. This places the vehicle occupant in a more effective position for protection by a secondary restraint such as an airbag.

A modern pretensioner comprises a piston driven along a cylinder by gas from a pyrotechnically detonated gas generator. The piston is connected to a cable, that in turn is connected through a buckle to the webbing of a restraint retractor. On activation, the piston pulls the cable which in turn tensions the retractor webbing, pulling the webbing tight around the vehicle occupant. At the end of the pretensioning stroke it is necessary to stop the piston and prevent it moving back down the cylinder which would loosen the webbing again.

Various forms of locking mechanisms for the piston have been devised. An elliptical disc may be attached to the piston in such a way that it slides easily along the tube in a pretensioning direction but is tilted to jam into the sides of the tube in the reverse direction. This locks the piston against reverse movement.

Alternatively it has been proposed to place loose locking balls around a groove in the piston, on a tapering surface arranged such that the balls are located in the deepest part of the groove when the piston is moving in the pretensioning direction. However, when the piston is pulled back by the inertia of the occupant at the end of the pretensioning pulse, the balls slide to a shallower part of the groove and consequently engage the inner surface of the cylinder providing the requisite braking effect.

These prior art designs are expensive since they require many component parts that must be manufactured to close tolerances.

SUMMARY OF THE INVENTION

According to the present invention there is provided a locking mechanism for a pretensioner in a vehicle safety restraint, the pretensioner comprising: a cylinder; a piston mounted for movement within and along the cylinder; and a cable connected at one end to the piston and at its other end to the safety restraint, wherein the locking mechanism comprises: a locking block and means for resiliently biasing the block away from the piston toward the inside wall of the cylinder.

Preferably the block is tapered, in the form of a wedge, in that it has a surface which is inclined at an angle to the longitudinal axis of the cylinder. Advantageously the block is slidably located on an angular sloping surface of the piston, i.e. on a surface inclined at an angle to the longitudinal axis of the cylinder, and the resilient biasing means acts in the longitudinal direction. There may be a plurality of blocks, for example three wedges circumferentially spaced around the piston.

In a first embodiment, the piston surface is inclined towards the nearest inner wall of the cylinder, and in a second embodiment it is inclined towards the cable, in the direction of travel of the piston in the pretensioning direction.

According to the first embodiment the inclined surface or surfaces on the piston and on the block are such that the resilient bias, provided for example by spring pressure, tends to push the block towards the inside surface of the cylinder. Frictional forces between the block and the inside cylinder surface will enhance this effect and when the piston is urged in one direction (i.e. that opposite to the pretensioning direction), then the blocks are forced into locking contact with the wall, preventing reverse movement of the piston. Movement of the piston in the opposite direction, i.e. the pretensioning direction, is not inhibited because in this direction the friction between the inner wall of the cylinder and the block tends to push the wedge down the sloping surface and out of contact with the cylinder wall.

According to the second embodiment of the invention the inclined surface or surfaces are in the piston housing and are such that the resilient bias, e.g. spring pressure, pushes the block or blocks towards the cable to grip the cable to prevent reverse movement of the cable after pretensioning. In this embodiment the blocks preferably have teeth on their surface which faces the cable, to improve the grip.

The resilient bias may be provided by a pressure ring with one or more spring legs arranged at positions corresponding to the position of the wedge or wedges.

BRIEF DESCRIPTION OF THE DRAWINGS

For a better understanding of the invention and to teach how the same may be carried into effect, reference will now be made to the accompanying drawings.

DETAILED DESCRIPTION OF THE INVENTION

Figure 1:
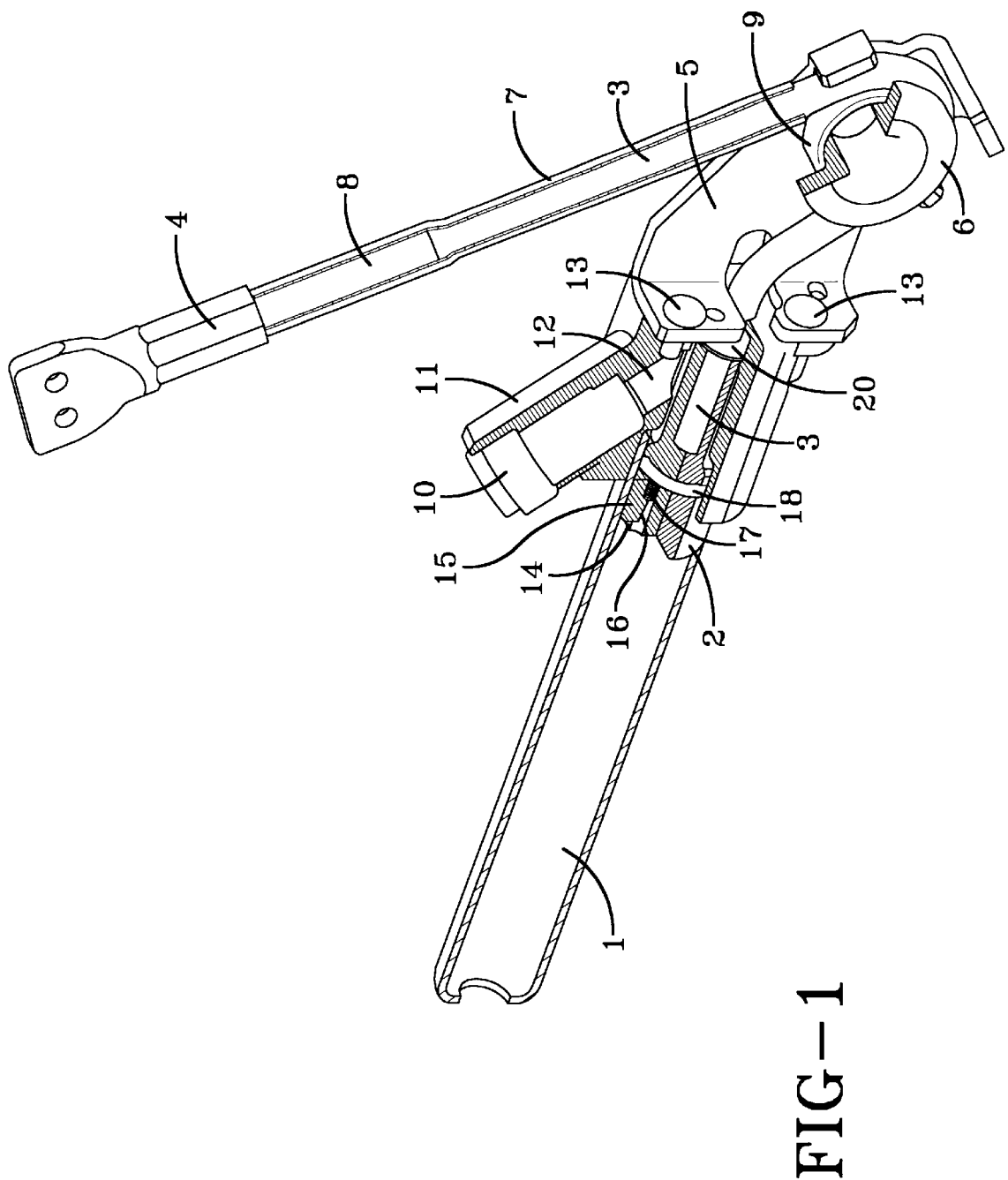
FIG. 1 is a partly cut-away perspective view of a pretensioner according to a first embodiment of the invention.

Throughout the figures like parts are denoted by the like reference numbers where appropriate. Two embodiments are shown: that of FIGS. 1 to 3 and that of FIGS. 4 to 6.

The pretensioner is shown as comprising a cylindrical brake tube 1 and a piston 2 connected to one end of a cable 3. The cable 3 is connected at its other end to a buckle anchor part 4, and passes through a hole in a bracket 5, over a roller 9 mounted on a flanged bush 6, and through a shrink tube 7 via a shock absorber 8.

A gas generator 10 is located in an upper branch of a gas generator housing 11. The upper branch has an outlet 12 communicating with a lower branch connected to the tube 1 on the cable side of the piston 2.

The tube 1 is attached to the lower branch of gas generator housing 11, for example by a threaded fitting (not shown) and the housing 11 is fixed to bracket 5 by Torx® head screws 13 in the illustrated embodiment (although any suitable attachment may be used).

An O-ring seal 18 sits in a groove 26 in the piston body and inhibits gas from the gas generator 10 leaking into the cylinder tube 1. A cable seal 20 seals between the cable 3 and the housing 11. In this way the maximum pressure from the gas generator is directed at moving the piston 2 along the tube 1 to pull the cable and thus pretension the seat belt restraint. The piston is arranged to slide along the tube 1 in the direction of arrow 22 under pretensioning conditions.

Figure 2:
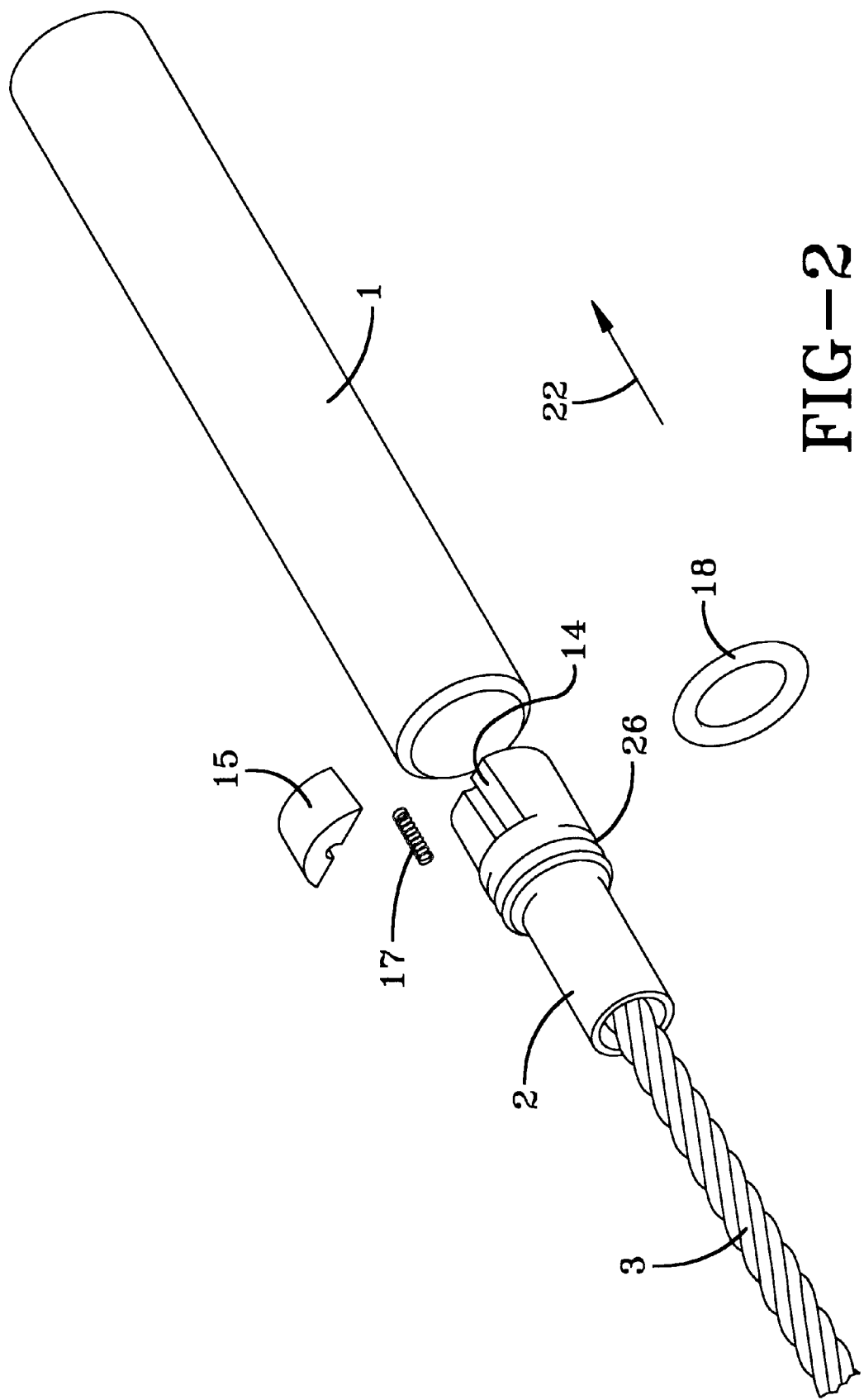
FIG. 2 is an exploded view of part of the pretensioner of FIG. 1.

In FIGS. 1 and 2 the piston 2 comprises a main generally cylindrical body with a cutout defining a ramp surface 14. On this surface is slidably mounted a locking wedge 15 which also has an inclined ramp face 16. The wedge 15 rests on the main body of the piston 2 and is under pressure by a spring 17 urging the wedge up the sloping ramp surface 14 towards the inside wall of the cylinder tube 1.

Figure 3:
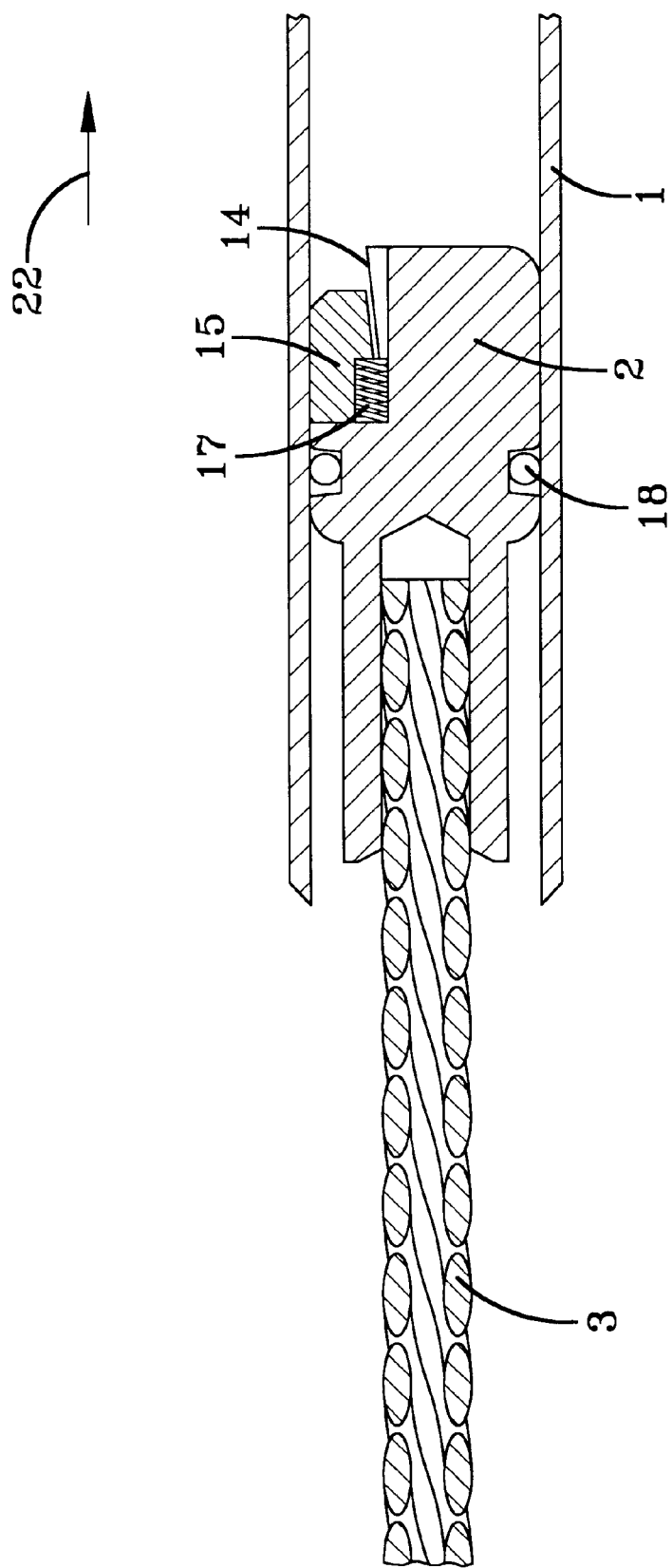
FIG. 3 is a cross-sectional view of part of the pretensioner of FIG. 1.

The construction of the piston 2 is shown more clearly in FIGS. 2 and 3. The cable 3 is shown crimped or welded to the single piece main body of piston 2. The O-ring seal 18 fits in a groove 26 on piston 2 to resist escape of gas into the tube 1 from the pressurized side of piston 2. A cut-out on top of the piston 2 has an angled surface 14 on which is located the tapered wedge 15 biased by the spring 17 to an outward location, i.e. towards the upper end of the ramped surface 14.

In FIG. 3 the wedge can be seen in its free position at the bottom of ramped surface 14 as the piston travels along the cylinder tube 1 in the pretensioning direction shown by arrow 22.

However at the end of the pretensioning stroke, as the gas pressure behind the piston 2 falls, then the inertia of the occupant tends to pull the piston 2 back, in the opposite direction to pay out more webbing. As the piston 2 moves along the tube 1 in the opposite direction to arrow 22 the wedge 15 slides up the ramp surface 114 of the piston 2 under pressure from the spring 17. It thus begins to subsequently frictionally engage the inside surface of the tube 1 and thus applies a braking effect.

Figure 4:
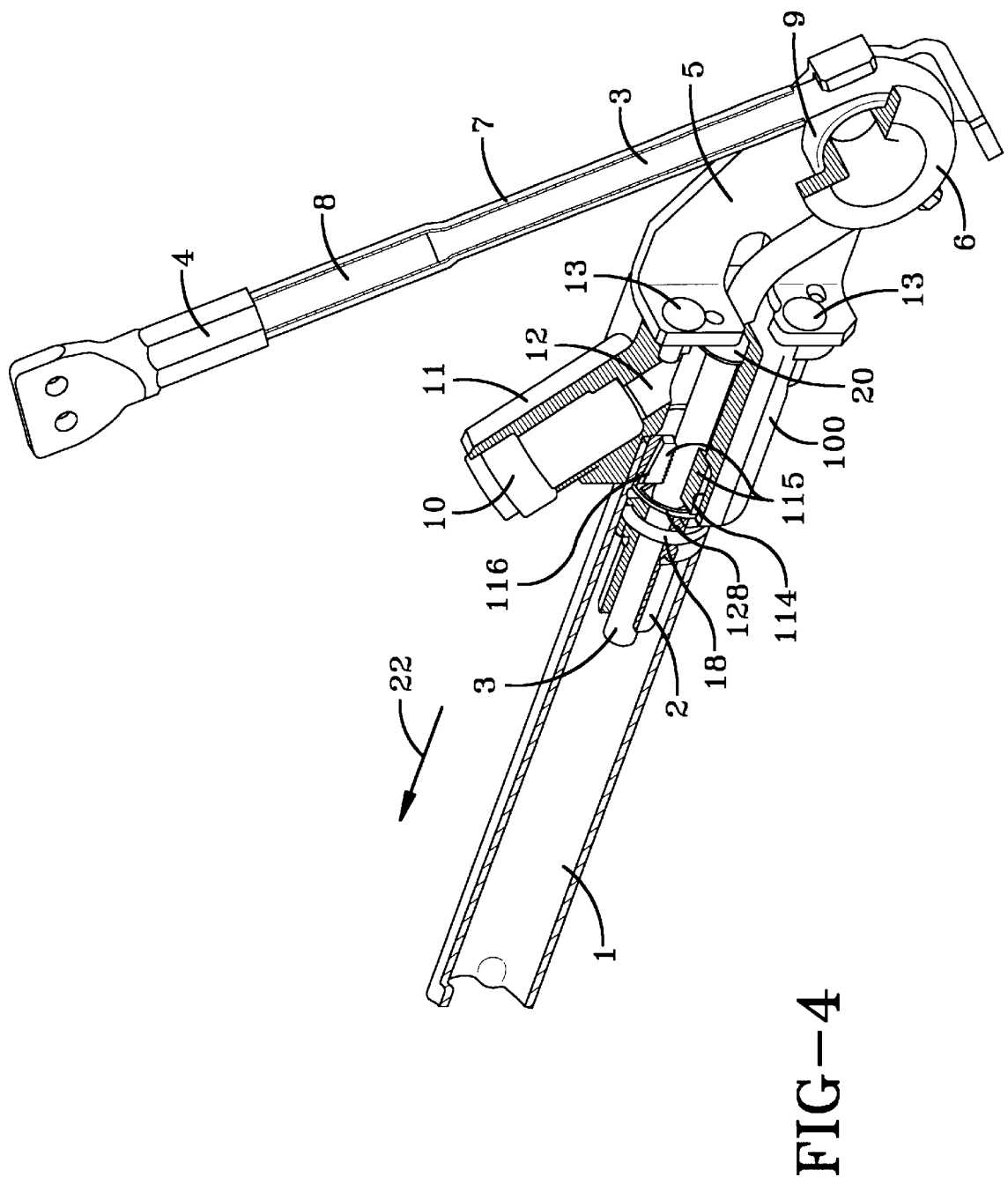
FIG. 4 is a partly cut-away perspective view of a pretensioner according to a second embodiment of the invention.
Figure 5:
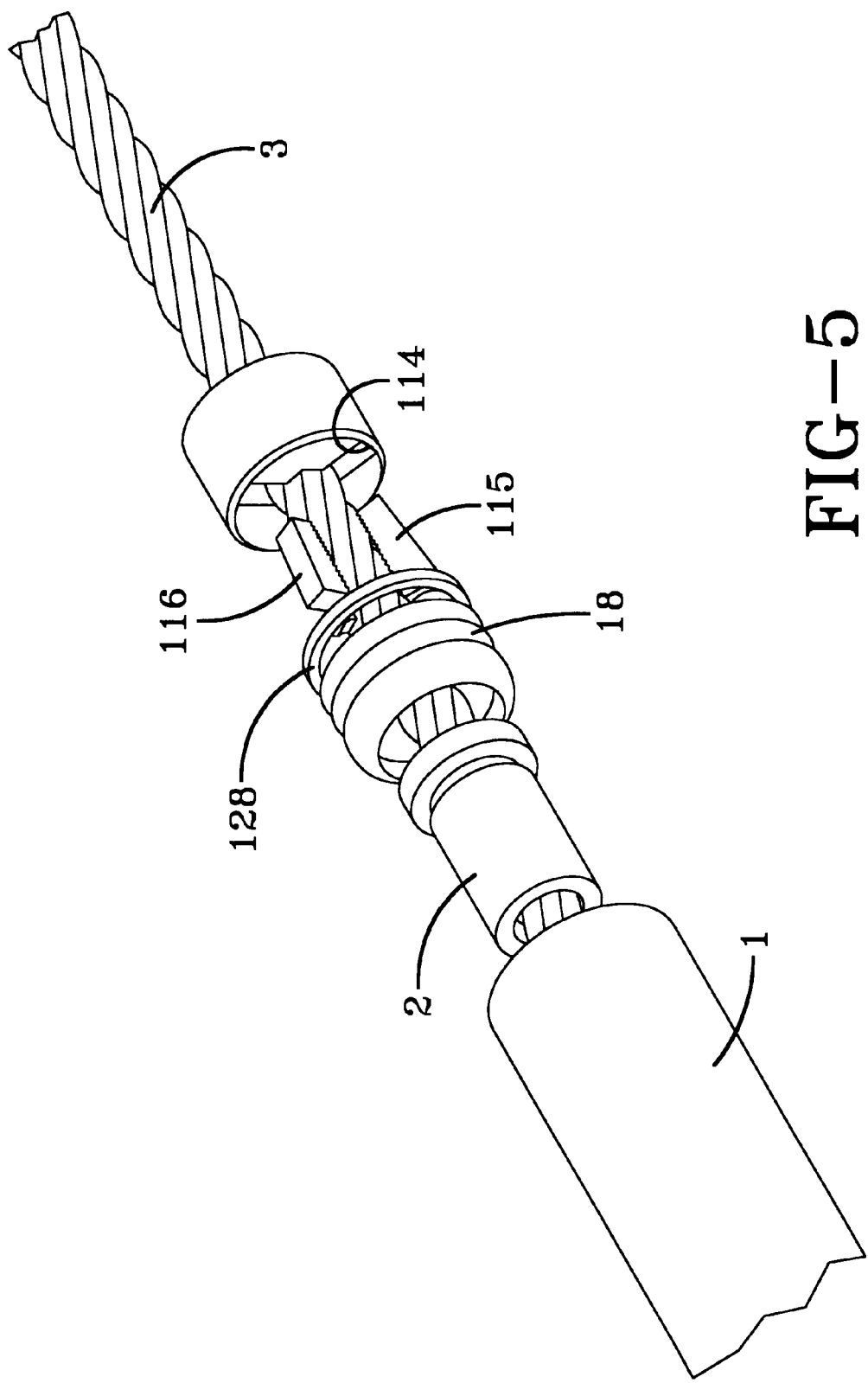
FIG. 5 is an exploded view of part of the pretensioner of FIG. 4.
Figure 6:
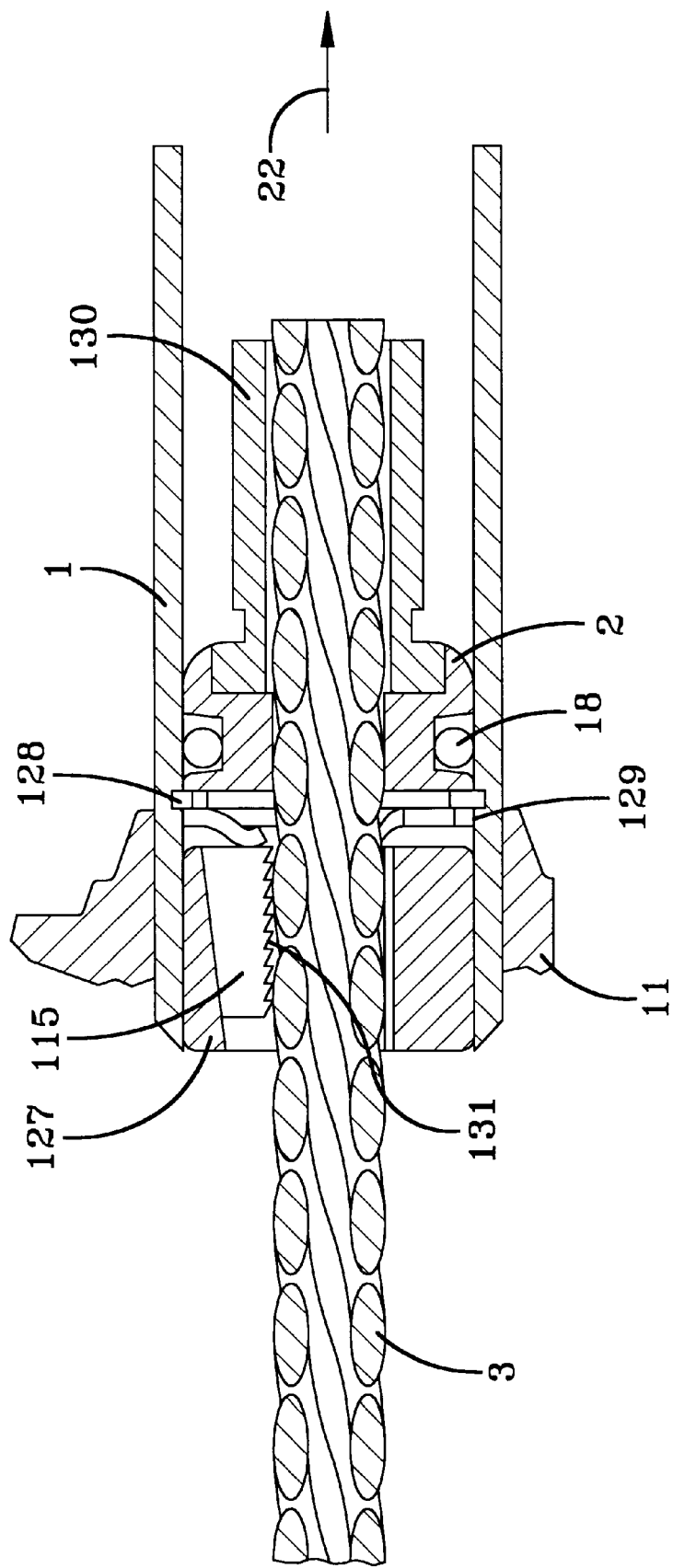
FIG. 6 is a cross-sectional view of part of the pretensioner of FIG. 4.

In the second embodiment of FIGS. 4 to 6 the piston 2 is of conventional form without a cut-out and wedges 115 are located in a locking wedge housing 100 contained in the lower part of the gas generator housing 11.

In this second embodiment the wedges 115 are arranged to prevent reverse movement by acting to grip the cable directly.

In the pretensioning phase, the piston 2 moves along tube 1 in the direction of arrow 22. The wedges 115 are biased by pressure ring 129 held in place by circlip 128. The wedges 115 are thus biased in a direction towards the "bottom" of ramp surface 114, i.e. where the cutout forming the ramp surface is deepest. This allows clearance between the wedges 115 and the cable 3 and thus free movement of the piston in the pretensioning direction.

At the end of the pretensioning stroke the piston 2 starts to move back along the tube 1 towards the bracket 5 under the force of the occupant's inertia. This return motion tends to move the wedges 115 in the opposite direction towards the shallower end of the ramp surface 114 and the cable 3. They are thus forced into engagement with the cable 3 and trip it with the aid of teeth 131 on their cable facing surfaces. Thus return motion of the cable is prevented.

The cable 3 is crimped to the piston 2 by means of cable crimp 130.

Many changes and modifications in the above described embodiments of the invention can, of course, be carried out without departing from the scope thereof. Accordingly, that scope is intended to be limited only by the scope of the appended claims.

I claim:

1. A pretensioner for a vehicle safety restraint comprising:
   a cylinder;
   a piston mounted for movement within and along the cylinder;
   a cable connected at one end to the piston and another end to the safety restraint; and,
   a locking mechanism comprising a locking block slidably located on a surface of the piston and means for resiliently biasing the block away from the piston toward an inside wall of the cylinder, wherein the piston surface is inclined towards the nearest inner wall of the cylinder in the direction of travel of the piston in a pretensioning direction.

2. The pretensioner for a vehicle safety restraint according to claim 1 wherein the means for resiliently biasing acts in a direction having a component parallel to a longitudinal axis of the cylinder.

3. The pretensioner for a vehicle safety restraint according to claim 2 wherein the locking block is tapered and has a surface which is inclined at an angle to the longitudinal axis of the cylinder.

4. The pretensioner for a vehicle safety restraint according to claim 1 wherein the locking block is tapered and has a surface which is inclined at an angle to a longitudinal axis of the cylinder.

5. The pretensioner for a vehicle safety restraint according to claim 1 wherein the piston is attached directly to the cable.

6. The pretensioner for a vehicle safety restraint according to claim 1 wherein the inclined piston surface is arranged so that a resilient bias tends to push the block towards the inside wall of the cylinder and when the piston is urged in a direction opposite to the pretensioning direction the block is forced into locking contact with the wall, preventing reverse movement of the piston.

7. The pretensioner for a vehicle safety restraint according to claim 1 wherein an inclined surface of the block is arranged so that a resilient bias tends to push the block towards the inside wall of the cylinder and when the piston is urged in a direction opposite to the pretensioning direction the block is forced into locking contact with the wall, preventing reverse movement of the piston.

8. The pretensioner for a vehicle safety restraint according to claim 1 wherein the means for resilient biasing is a compression spring.

9. The pretensioner for a vehicle safety restraint according to claim 1 wherein the means for resiliently biasing the block away from the piston is positioned between the piston and the block.

10. A pretensioner for a vehicle safety restraint comprising:
    a cylinder;
    a piston mounted for movement within and along the cylinder;
    a cable connected at one end to the piston and another end to the safety restraint; and,
    a locking mechanism comprising a plurality of locking blocks and a pressure ring with one or more spring legs arranged at positions corresponding to positions of the plurality of blocks for resiliently biasing the blocks toward the cable to grip the cable and prevent reverse movement of the cable.

11. The pretensioner for a vehicle safety restraint according to claim 10 wherein the block has teeth that face the cable.

\* \* \* \* \*